United States Patent [19]

Kogure

[11] Patent Number: 5,309,964
[45] Date of Patent: May 10, 1994

[54] PNEUMATIC TIRE HAVING TREAD PATTERN ARRAYED FOR REDUCED NOISE

[75] Inventor: Tomohiko Kogure, Minami Ashigara, Japan

[73] Assignee: The Yokohama Rubber Co., Ltd., Tokyo, Japan

[21] Appl. No.: 725,109

[22] Filed: Jul. 3, 1991

Related U.S. Application Data

[63] Continuation-in-part of Ser. No. 590,442, Sep. 27, 1990, abandoned, which is a continuation of Ser. No. 348,933, May 8, 1989, abandoned.

[30] Foreign Application Priority Data

May 11, 1988 [JP] Japan .................................. 63-112544

[51] Int. Cl.$^5$ ............................................ B60C 11/03
[52] U.S. Cl. ............................................... 152/209 R
[58] Field of Search ...................... 152/209 R, 209 D

[56] References Cited

U.S. PATENT DOCUMENTS

| | | | |
|---|---|---|---|
| 3,926,238 | 12/1975 | Vorih | 152/209 R |
| 4,178,199 | 12/1979 | Lippman et al. | 152/209 R |
| 4,474,223 | 10/1984 | Landers | 152/209 R |
| 4,823,853 | 4/1989 | Hitzky | 152/209 R |

*Primary Examiner*—Geoffrey L. Knable
*Attorney, Agent, or Firm*—Nikaido, Marmelstein, Murray & Oram

[57] ABSTRACT

A pneumatic tire wherein two to ten periods of 3 to 8 types of pitches different from each other in the length constitute the whole circumference of a tread surface, and the proportion $\alpha_i$ of each pitch in the whole circumference of the tread surface is specified in a particular range.

2 Claims, 4 Drawing Sheets

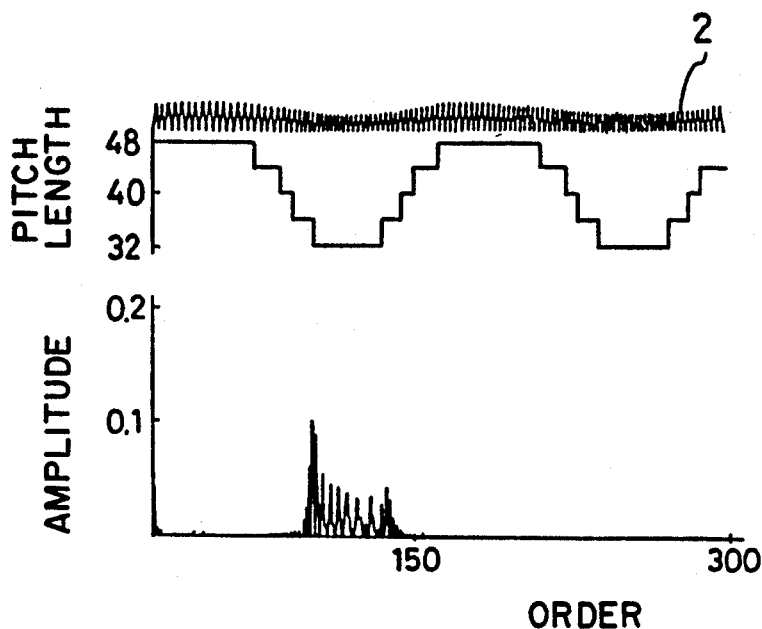
FIG.1(a)
FIG.1(b)
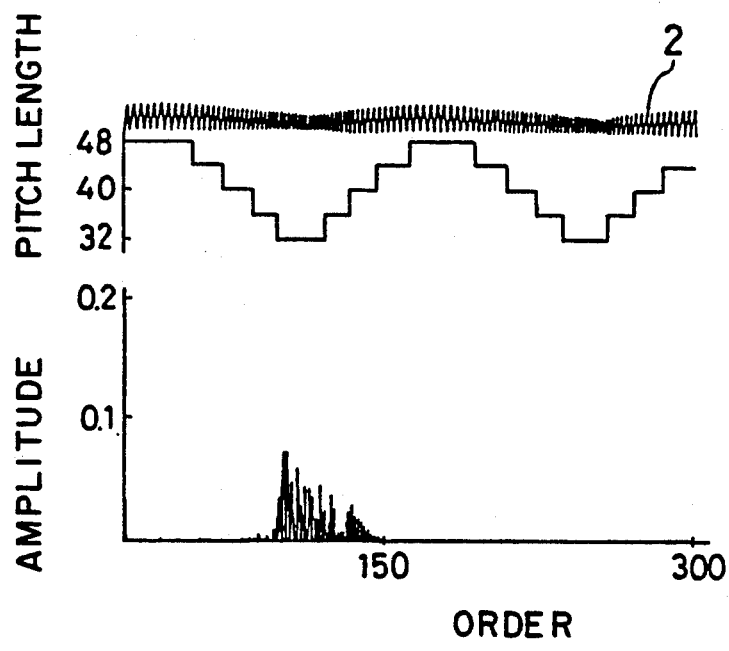
FIG.2(a)
FIG.2(b)

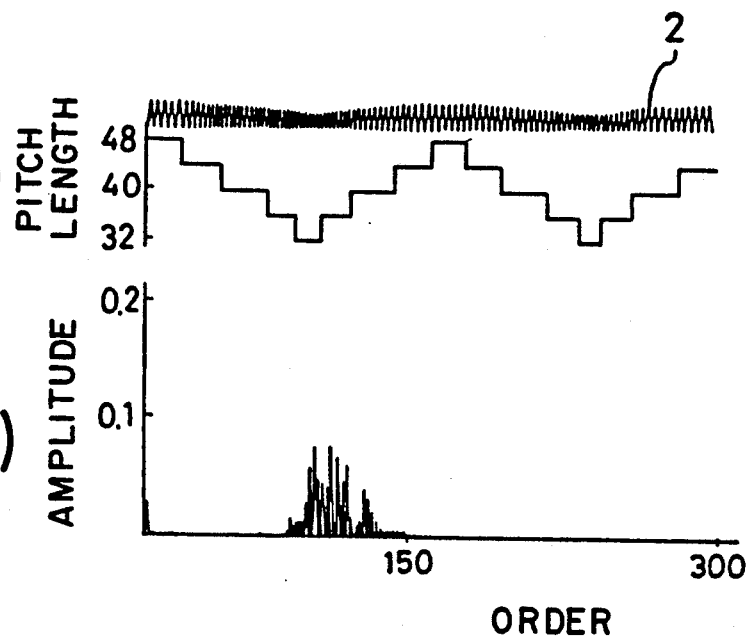
FIG.3(a)
FIG.3(b)
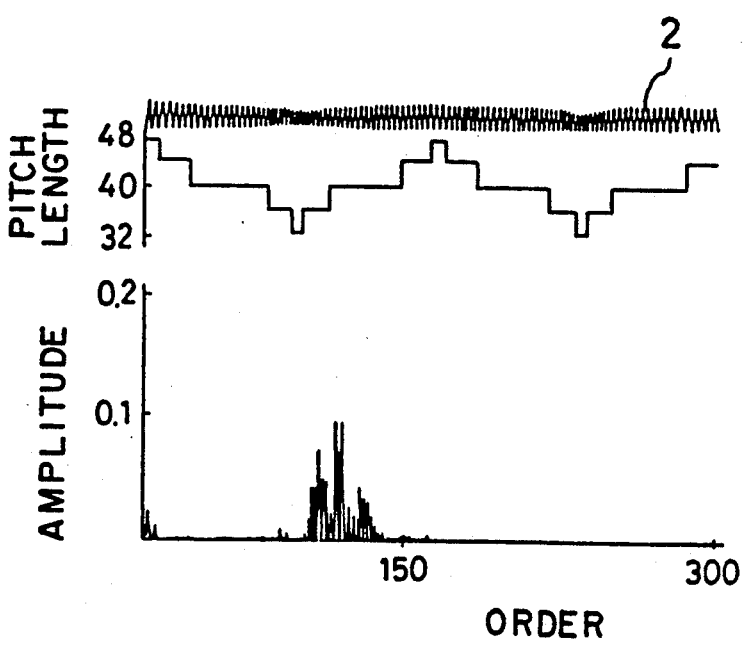
FIG.4(a)
FIG.4(b)

FIG. 7
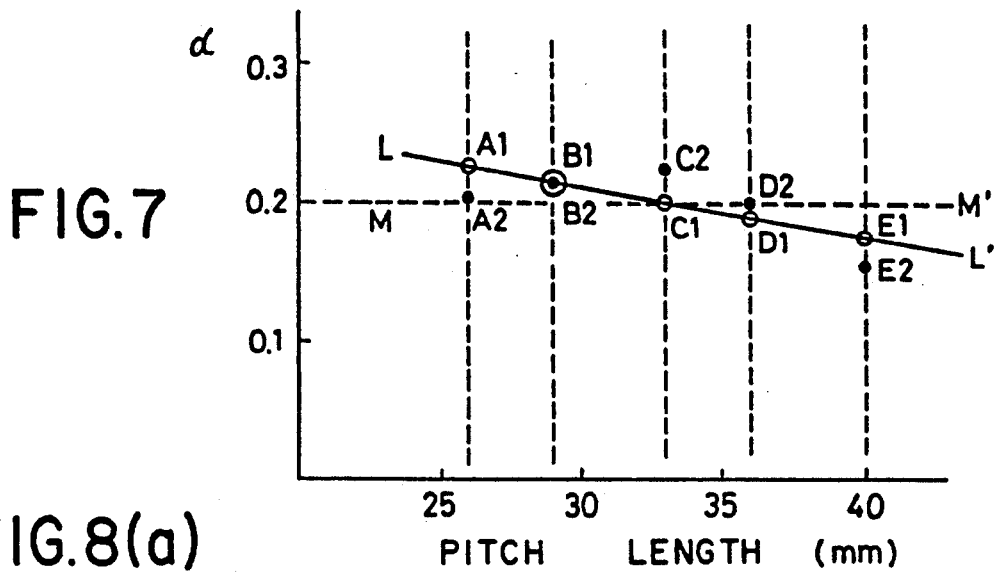
FIG. 8(a)
FIG. 8(b)
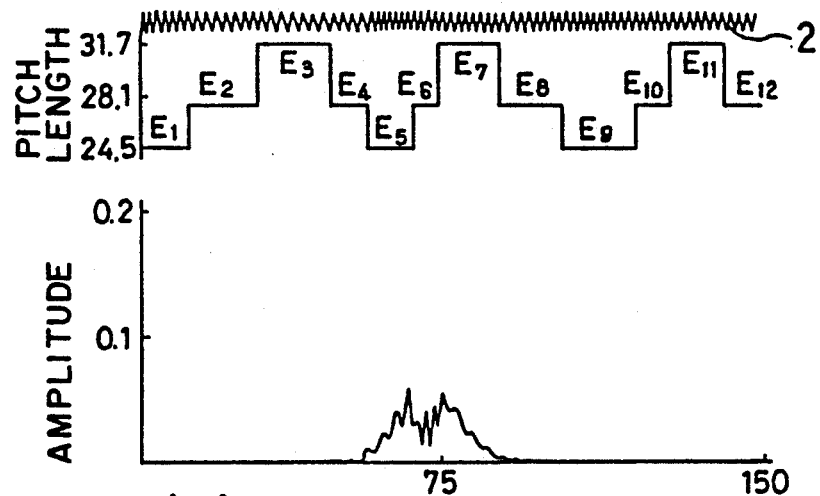
FIG. 9(a)
FIG. 9(b)
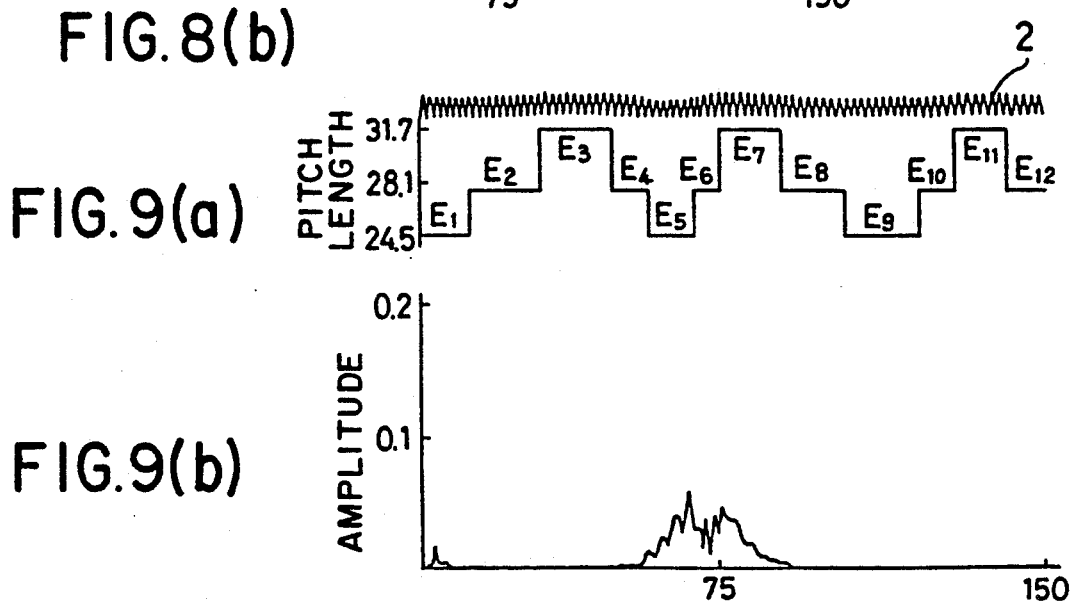

PNEUMATIC TIRE HAVING TREAD PATTERN ARRAYED FOR REDUCED NOISE

This application is a continuation-in-part of application Ser. No. 590,442, filed on Sep. 27, 1990, now abandoned, which was a continuation of application Ser. No. 348,933, filed on May 8, 1989 now abandoned.

BACKGROUND OF THE INVENTION

The present invention relates to a pneumatic tire with a plurality of tread design elements different from each other in the pitch length and arranged on the tread surface which enables a reduction in the noise (pattern noise) caused by the tread design element accompanying rolling of the tire.

In order to reduce the pattern noise, a proposal has been made in the art on dispersion of the pattern noise in a wide frequency range (a frequency dependent upon the product of the number of revolutions of the tire and that of tread design elements) around the pitch frequency to make the noise inconspicuous. This method is called a variable pitch arrangement. In this method, several kinds of tread design elements (i.e., pitches) different from each other in the pitch length are properly provided in the circumferential direction of the tire so that the time intervals of a pulsatory noise or vibration caused when each tread design element is brought into contact with the ground surface is changed, thereby preventing the noise from concentrating on a particular frequency.

This method is based on frequency modulation theory employed in, for example, radio engineering. However, in this method, no sufficient reduction in the pattern noise can be attained.

The present inventors have made studies with a view to reducing the pattern noise and, as a result, have found that the pulsation of the sound pressure level must not be overlooked as a factor which worsens the impression of the tire noise. Specifically, when the conventional sound level measuring method wherein a sound level is expressed in terms of an average value in a given period of time provides the same sound level, the auditory feeling of the human being frequently finds a difference in the sound level. The present inventors have searched for the cause of the above-described phenomenon and, as a result, have found that this phenomenon is attributable to a difference between the sound pressure level which greatly pulsates in a frequency range as low as about 10 Hz or less and the sound pressure level which does not pulsate in such a frequency range. The pulsation of the sound level, i.e., the pulsation which is one of the main causes of the noise, can be determined by outputting the change in the sound pressure level with time through reproduction at a low speed of the noise recorded at a high speed. For example, the pulsation can be determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

In the theory of the conventional tread design element arrangement with respect to the sound pressure level, it is a common practice to simulate the dispersion on a frequency axis through Fourier expansion of a sine wave train generated at the same time intervals as the order of arrangement of the tread design elements in one turn of the tire, assuming that one sine wave is generated from one tread design element. In particular, various studies and proposals have been made on a theoretical analysis in such an arrangement that the pitches are successively arranged from a short pitch to a long pitch and again to a short pitch, thereby changing the pitch length in a sine wave form (see, e.g., Jidosha Gijutsu, Vol. 28, No. 1, 1974 "Taiya Noizu ni Tsuite", and Japanese Patent Laid-Open No. 115801/1979). In these observations, no discussion is made on the pulsation of the above-described sound pressure level because the observation is made assuming that the amplitude of the vibration generated from each tread design element is constant.

The present inventors have noted that a large circumferential length of the tread design element gives rise to a large level of a vibration generated from the element and have tried a theoretical calculation under the following assumption. That is, Fourier expansion has been made assuming that the vibration generated from each tread design element is a sine wave wherein the amplitude is increased in proportion to the circumferential length of the tread design element. As a result, it has been found that, as is apparent from FIGS. 8(a) and (b) and FIGS. 9(a) and (b), when assuming that sine waves having an equal amplitude are generated from each tread design element according to the conventional calculation method, no amplitude appears in a low frequency range as shown in FIG. 8(b), while when assuming that there occurs a sine wave having an amplitude corresponding to the pitch length of the tread design element, a vibration peak appears in a low frequency range corresponding to a particular periodicity of the tread design element arrangement as shown in FIG. 9(b). In particular, when the arrangement of the tread design elements is regular, the peak in this low-frequency range becomes significant, which enhances the pulsation of the sound pressure level, so that the impression of the noise is worsened.

FIGS. 8(a) and 9(a) are respectively explanatory views of pitch arrangements (tread design element arrangements). Numeral 2 designates a vibration wave form. FIG. 8(b) and FIG. 9(b) are each a graph showing the relationship between the order in the Fourier analysis and the amplitude corresponding to that order. In FIG. 8(a) and FIG. 9(a), the length of pitch A is 31.7 mm, that of pitch B is 27.5 mm and that of pitch C is 24.5 mm, and pitch group $E_1$ refers to a sequence of C C C C C C, pitch group $E_2$ of refers to a sequence of B B B B B B B, pitch group $E_3$ refers to a sequence of A A A A A A, pitch group $E_4$ refers to a sequence of B B B B, pitch group $E_5$ refers to a sequence of C C C C C C, pitch group $E_6$ refers to a sequence of B B B, pitch group $E_7$ refers to a sequence of A A A A A A, pitch group $E_8$ refers to a sequence of B B B B B B B, pitch group $E_9$ refers to a sequence of C C C C C C C C C, pitch group $E_{10}$ refers to a sequence of B B B B, pitch group $E_{11}$ refers to a sequence of A A A A A, and pitch group $E_{12}$ refers to a sequence of B B B B. The pitch arrangement shown in FIG. 8(a) is the same as that shown in FIG. 9(a). The term "pitch" used herein is intended to mean the minimum unit of a repeating pattern of constituting a tire tread design comprising a continuous repeating pattern provided in the circumferential direction of the tire. The term "pitch group" is intended to mean a portion wherein a plurality of the identical pitches among the pitches are arranged in sequence. The term "pitch length" is intended to mean the length of the pitch in the circumferential direction of the tire. The term "period" means a pitch arrangement or one of a number of sequentially arranged pitch arrangements which extend circumferentially around a tire tread surface.

SUMMARY OF THE INVENTION

An object of the present invention is to provide a pneumatic tire improved in the habitability and comfort of an automobile by virtue of a combination of a reduction in the pulsation of the sound pressure level though an improvement in the constitution and arrangement of the pitch with a reduction in the pattern noise through specification of a product of the length of each pitch and the number of pitches having said length and appearing on the circumference of the tire.

In order to attain the above-described objects, the present invention provides a pneumatic tire wherein 3 to 8 types of pitches different from each other in the length are arranged in two to ten periods over the whole circumference of a tread surface and, when the length of the pitch of the i-th type is assumed to be $P_i$, the total number of said pitches appearing on the whole circumference of the tire is assumed to be $N_i$, the proportion $\alpha_i$ of the pitch of the i-th type is represented by the formula $\alpha_i = (P_i \times N_i)/$whole perimeter and NP is the number of types of the pitch length, (a) the $\alpha_i$ value falls within a range defined by varying the $\alpha$ value by $\pm$ 10% with respect to a line LL' formed by connecting the a values to each other plotted as the ordinate against the pitch length as the abscissa in which the $\alpha$ value of the length of the longest pitch is set to a value between $(1/NP) \times 0.2$ and $(1/NP)$, and the $\alpha$ value of the length of the shortest pitch is set to a value between $(1/NP)$ and $(1/NP) \times 1.8$, or (b) the $\alpha_i$ value falls within a range defined by varying the $\alpha$ value by $\pm$ 10% with respect to a polygonal line ll' formed by connecting the a values to each other plotted as the ordinate against the pitch length as the abscissa and determined by reducing each of the $\alpha$ values of the longest pitch and the shortest pitch by 4 to 30% from the values determined by the line LL' defined in the above requirement (a) and increasing each of the a values of the second longest pitch and the second shortest pitch by 4 to 30% based on the values determined by line the LL'.

BRIEF DESCRIPTION OF THE DRAWINGS

FIGS. 1(a) and (b), FIGS. 2(a) and (b), FIGS. 3(a) and (b), and FIGS. 4(a) and (b) are each a graph showing the relationship between the pitch arrangement and the order in Fourier analysis and the amplitude corresponding to that order;

FIGS. 5, 6, and 7 are each a graph showing the relationship between the pitch length and the proportion $\alpha_i$ of the pitch;

FIG. 8(a) and FIG. 9(a) are each an explanatory view of a pitch arrangement; and FIG. 8(b) and FIG. 9(b) are respectively graphs showing the relationship between the order in Fourier analysis and the amplitude corresponding to that order with respect to the pitch arrangements shown in FIG. 8 (a) and FIG. 9 (a).

DETAILED DESCRIPTION OF THE PREFERRED EMBODIMENTS

Figure 5:
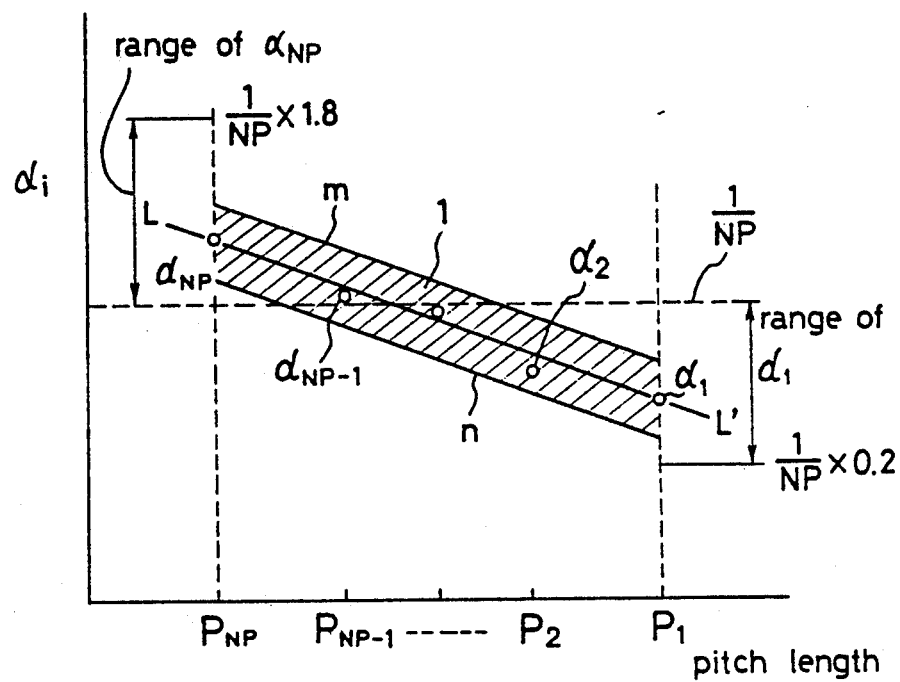

The present inventors have attempted to conduct various calculations with respect to the above-described pulsation of the pitch noise, i.e., with respect to low-frequency components in such a pitch arrangement that the length of the pitch is regularly varied. As a result, it has been found that the total number of pitches of each type appearing on the circumference of the tire is an important factor. Accordingly, as shown in FIGS. 1(a) and (b), FIGS. 2(a) and (b), FIGS. 3(a) and (b), and FIGS. 4(a) and (b), with respect to 5 types of pitches respectively having lengths of 48 mm, 44 mm, 40 mm, 36 mm, and 32 mm, calculations were conducted while varying the total number $N_i$ of pitches of each type appearing on the circumference of the tire as shown in the following Table 1.

TABLE 1

| Pitch length (mm) | $N_i$ | | | |
|---|---|---|---|---|
| | FIG. 1 | FIG. 2 | FIG. 3 | FIG. 4 |
| 48 | 30 | 20 | 10 | 4 |
| 44 | 16 | 20 | 24 | 20 |
| 40 | 8 | 20 | 32 | 52 |
| 36 | 16 | 20 | 24 | 20 |
| 32 | 30 | 20 | 10 | 4 |

Since the regularity of the arrangement is such that two periods are involved in the whole circumference of the tire, the Fourier expansion causes a peak to appear in a second order. The larger the number of intermediate pitches, the smaller the peak. On the other hand, observations of peaks appearing around a pitch frequency (around the order corresponding to the total number of pitches) have revealed that an increase in the number of the shortest and longest pitches brings about a reduction in the components around the center of the pitch frequency and causes an appearance of peaks on both sides thereof. However, an increase in the number of intermediate pitches causes peaks to appear around the center of the pitch frequency. It may be concluded from the above-described facts that there exists a proper value with respect to the distribution in the number of respective pitches for minimizing the pitch noise. Further, judging from the characteristics of the Fourier expansion, the proportion of time occupied by each pitch, i.e., the proportion of the product of the pitch length and the number of pitches, is important rather than the arrangement of the number of respective pitches.

The above-described theoretical background has led to a conclusion that when the proportion of the length of each pitch relative to the whole perimeter is small, the proportion $\alpha$ of that pitch is large and that when the proportion $\alpha$ of the shortest and longest pitches is smaller than that of other pitches, a well balanced improvement of the components associated with the low-order pulsation and the components associated with the pitch frequency can be attained. The present invention has been made based on the above-described finding.

(1) In the present invention, 3 to 8 types of pitches different from each other in the length are arranged in two to ten periods to constitute the whole circumference of a tread surface.

The larger the number of types of the pitches, the larger the reduction in the noise. However, this brings about an increase in the manufacturing cost of a mold.

In view of the above, the number of types of pitches was limited to 3 to 8.

The pneumatic tire according to the present invention comprises two to ten periods over its full circumference. If the full circumference of a tire consists of a single period, the period is so long that the change of pitches over the tire circumference has to be very graduate, when the tire tends to produce pulsed noise, disadvantageously. Then, if the number of periods over the full circumference of the tire is greater than ten, the dispersion of noise frequencies tends to be ineffective for attaining the object of the present invention.

Each period consists of a pitch arrangement comprising a same number of pitch groups as the number of variety of pitches. Each pitch group consists of a same pitch. In each period, a variety of pitches is arranged in a sequence of from a group of shortest pitches to a group of longest pitches and then to a group of shortest pitches in the circumferential direction of a tire. Each period starts with a shortest pitch in a group of shortest pitches and ends immediately before a first shortest pitch of a second group of shortest pitches which appears on a second occurrence in the circumferential direction of the tire.

(2) Further, in the present invention, when the length of the pitch of the i-th type is assumed to be $P_i$, the total number of said pitches appearing on the whole circumerence of the tire is assumed to be $N_i$, the proportion $\alpha_i$ of the pitch of the i-th type is represented by the formula $\alpha_i = (P_i \times N_i)$/whole perimeter and NP is the number of types of the pitch length, one of the following requirements (a) and (b) must be satisfied.

(a) The $\alpha_i$ value must fall within a range defined by varying the $\alpha$ value by ± 10% with respect to a line LL' formed by connecting the $\alpha$ values to each other plotted as the ordinate against the pitch length as the abscissa in which the $\alpha$ value of the length of the longest pitch is set to a value between $(1/NP) \times 0.2$ and $(1/NP)$, and the $\alpha$ value of the length of the shortest pitch is set to a value between $(1/NP)$ and $(1/NP) \times 1.8$.

FIG. 5 is a graph showing the relationship between the pitch length and the $\alpha_i$ value, wherein m is an upper line (whereon the $\alpha$ values are by 10% larger than those on the line LL'), n is a lower line (whereon the $\alpha$ values are by 10% smaller than those on the line LL'), $P_1$ is the length of the longest pitch, $P_{np}$ is the length of the shortest pitch, $\alpha_i$ is the $\alpha$ value of the length of the longest pitch, and $\alpha_{np}$ is the $\alpha$ value of the length of the shortest pitch. In this figure the $\alpha_i$ values fall within the hatched section 1.

With respect to the vibration generated from each pitch, the larger the pitch, the larger the vibration. Therefore, also in the frequency dispersion of the noise, the component generated from a large pitch is more intense. Thus equalization of the $\alpha_i$ values intensifies the components on the side of a low frequency corresponding to the large pitch, which brings about uneven frequency dispersion, so that the noise peak becomes large. For this reason, an even frequency dispersion and minimization of the noise peak can be attained only by decreasing the $\alpha$ value of the large pitch and increasing the $\alpha$ value of the small pitch. The even frequency dispersion can be attained by adjusting the distribution of the $\alpha$ values of respective pitches in such a manner that the $\alpha$ value of the smallest pitch length $P_{np}$ is by 0 to 80% larger than that in the case of an even distribution $(1/NP)$ [i.e., a value between $(1/NP)$ and $(1/NP \times 1.8)$] and the $\alpha$ value of the largest pitch length $P_1$ is by 0 to 80% smaller than that in the case of an even distribution $(1/NP)$ [i.e., a value between $(1/NP) \times 0.2$ and $(1/NP)$]. When the $\alpha$ value is outside the above-described range, there occurs an excessive increase in the smaller pitch components, so that it becomes impossible to attain an even frequency dispersion.

(b) The $\alpha_i$ value must fall within a range defined by varying the $\alpha$ value by ± 10% with respect to a polygonal line ll' formed by connecting the $\alpha$ values to each other plotted as the ordinate against the pitch length as the abscissa and determined by reducing each of the $\alpha$ values of the longest pitch and the shortest pitch by 4 to 30% from the values determined by the line LL' defined in the above requirement (a) and increasing each of the $\alpha$ values of the second longest pitch and the second shortest pitch by 4 to 30% based on the values determined by the line LL'.

In the case of only 3 different pitches, a second longest pitch and a second shortest pitch come to be identical with each other.

Figure 6:
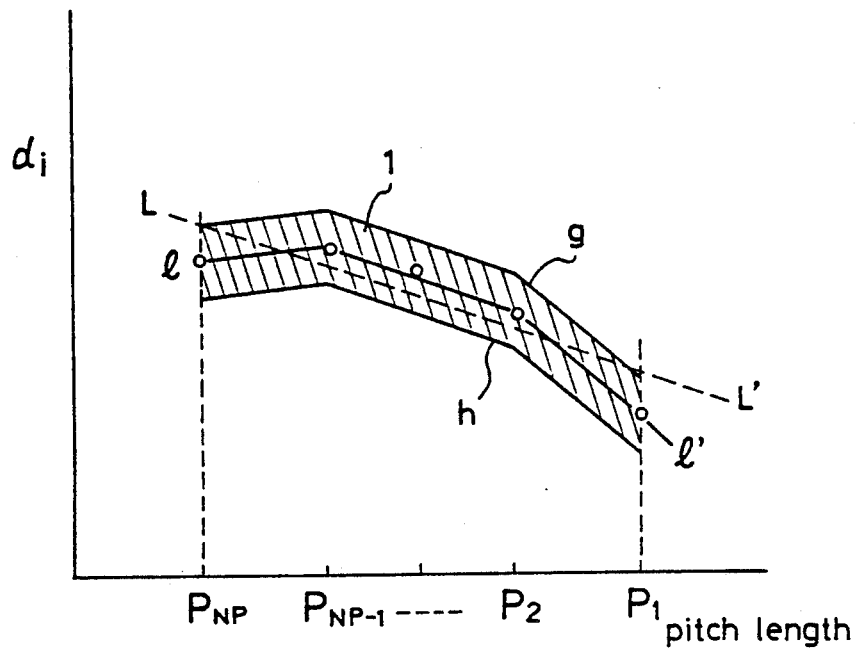

FIG. 6 is a graph showing the relationship between the pitch length and the $\alpha_i$ value, wherein g is an upper polygonal line (whereon the $\alpha$ values are by 10% larger than those on the line ll'), h is a lower line (whereon the a values are by 10% smaller than those on the line ll'), $P_1$ is the length of the longest pitch, $P_{np}$ is the length of the shortest pitch, and a line LL' is the same as that of FIG. 5. In FIG. 6, the $\alpha_i$ values fall within the hatched section 1.

In FIG. 6, the $\alpha_i$ values of the length $P_2$ of the second longest pitch to the length $P_{np-1}$ of the second shortest pitch on the line ll' are by 4 to 30% larger than those on the line LL', while the $\alpha_i$ values of the length $P_1$ of the longest pitch and the length $P_{np}$ of the shortest pitch on the line ll' are by 4 to 30% smaller than those on the line LL'.

When a low-frequency pulsation is taken into consideration, a reduction in the $\alpha$ values of both the length $P_1$ of the longest pitch and the length $P_{np}$ of the shortest pitch brings about a relative reduction in a change in the level of the vibration generated by each pitch, which contributes to a reduction in the pulsation. However, when the $\alpha$ values of $P_1$ and $P_{np}$ are excessively small, the maximum to minimum ratio of the pitch becomes substantially small, which unfavorably increases the pitch noise. For this reason, the $\alpha_i$ values of $P_1$ and $P_{np}$ on the line ll' are reduced by 4 to 30% those on the line LL'. Instead the $\alpha_i$ values of the pitches other than $P_1$ and $P_{np}$ on the line ll' are increased by the same proportion as that of the case of $P_1$ and $P_{np}$, i.e., 4 to 30%, from the values on the line LL'.

In other words, on a graph (co-ordinate) taking pitch lengths on the adscissa and proportions $\alpha_i$ of pitches (of respective pitch lengths) to a whole circumferential length of a tire on the ordinate, (i) a line LL' may be depicted by connecting together a proportion $\alpha_i$, within a range of $(1/NP) \times 0.2 \sim (1/NP)$, of the pitch or pitches of a maximum length $P_1$ to the whole circumferential length of the tire and a proportion $\alpha_{NP}$, within a range of $(1/NP) \sim (1/NP) \times 1.8$, of the pitch or pitches of a minimum length $P_{NP}$ to the whole circumferential length of the tire, and the line LL' may then be parallel moved to points at ±10% of each of the proportions $\alpha_1$ and $\alpha_{NP}$ to depict lines m and n, when the proportions $\alpha_i$ to $\alpha_{NP}$ lie within a range between the lines m and n.

(3) A particular procedure of calculating the pitch distribution according to the present invention will now be described.

a. First of all, as with the conventional pitch design, the ratio β of the maximum pitch length to the minimum pitch length and the total number N of pitches are determined. In order to reduce the tire noise, it is preferred for the N and β values to be both large. However, it is desirable that the N and β values are 1.3 to 1.8 and 40 and 90, respectively. In this calculation, an N value of 57 and a β value of 1.54 are provisionally selected.

b. Next, the length of each pitch is determined from the outer diameter of the tire and the N and β values. When calculation is conducted with respect to a tire having an outer diameter D of 600 mm, $D \times \pi \div N = 33.07$. This value is rounded off to obtain the length of the intermediate pitch of 33 mm.

c. Then, the number of types of pitches is determined. As described above, the number of types is 3 to 8. In this calculation, 5 types of pitches are adopted.

d. In the design of 5 types of pitches under conditions of a β value of 1.54 and an intermediate pitch length of 33 mm, when a difference in length both between the longest and the intermediate pitches and between the intermediate and the shortest pitches is assumed to be k, $(33+k)/(33-k) = \beta = 1.54$. Therefore, k=7, which gives a largest pitch length of 40 and a smallest pitch length of 26. The remaining three types of pitches are properly selected from values between the largest and smallest pitch lengths. In this case, pitch lengths of 40 mm, 36 mm, 33 mm, 29 mm, and 26 mm are selected.

e. With respect to the criteria for the pitch distribution, since the number of types of pitches are 5, the proportion α of each type of pitch is (1/5), i.e., 0.2. As shown in FIG. 7, based on this, a line MM' is determined wherein pitches are to be equally distributed.

f. Next, as shown in FIG. 7, a line LL' for giving a larger proportion to a shorter pitch is determined from an intersection Cl of a middle point between the largest pitch length and the smallest pitch length with the line MM', and Al or El. The point Al is on a vertical line with respect to the smallest pitch length, i.e., 26 mm. This point is by 13.5% higher than the α value of the equal distribution (α=0.2), i.e., has an α value of 0.227. When a line LL' is determined with respect to the largest pitch length 40 mm, this line is obtained by connecting point Cl to point El located on a vertical line with respect to the largest pitch length 40 mm and by 12.5% lower than the α value of the equal distribution (α=0.2), i.e., given by an α value of 0.175.

g. Thus, the line LL' is determined by varying the α value of the shortest or longest pitch by 0 to 80% from the α value of the equal distribution. However, when the line is left descended (i.e., the α value is decreased in the shortest pitch and increased in the longest pitch), the influence of longer pitches is so large that a large peak occurs at a low frequency among the pitch frequencies. On the other hand, when the gradient exceeds 80%, the influence of shorter pitches is so large that a large peak occurs at a high frequency among the pitch frequencies.

h. When the line LL' is thus determined, a second reference distribution is obtained from an intersection of each pitch length with the line LL'. As shown in FIG. 5, when the pitches are assumed to be A, B, C, D, and E in the order from the shorter pitch to the longer pitch, the α values of points Al, Bl, Cl, Dl, and El are determined as follows (α₁ is the second reference distribution). A deviation exceeding 10% from the second reference distribution brings about no effect of reducing the noise.

|    | $\alpha_i$ |
|----|-------|
| A1 | 0.227 |
| B1 | 0.218 |
| C1 | 0.200 |
| D1 | 0.190 |
| E1 | 0.175 | i. Next, attention is drawn to low frequencies, and the proportions of the longest and shortest pitches are reduced, while the proportion of the intermediate pitch is increased. In the longest pitch, the α value was reduced by 14.3% from that of E1 of 0.175 to give an α value of E2 of 0.15. In the shortest pitch, the α value was reduced by 9.7% from that of A1 of 0.227 to give an α value of A2 of 0.205. In the intermediate pitch, the α value was increased by 12.5% from that of C1 of 0.200 to give an α value of C2 of 0.225.

j. Thus, the low-frequency pulsation can be reduced by reducing the α values by 4 to 30% from the second reference distribution in the shortest and longest pitches, and increasing the α value by 4 to 30% in the intermediate pitch. When the variation is less than 4%, little or no effect of reducing the pulsation can be attained, while when it exceeds 30%, the dispersion in the pitch frequency becomes insufficient.

k. The remaining two types of pitches are designed so that the variation is intermediate between both adjacent variations. Specifically, in pitch B, no variation is adopted since pitch A was reduced by 9.7% and pitch C was increased by 12.5%. On the other hand, in pitch D, since pitch C was increased by 12.5% and pitch E was reduced by 14.3%, the α value was increased by 5.3%. Thus, each proportion $\alpha_i$ was determined as follows (wherein $\alpha_i'$ is a corrected value). When the total of the $\alpha_i$ values is not 1.0, correction is made by proportionating respective $\alpha_i$ values.

|       | $\alpha_i$ | $\alpha_i'$ |
|-------|--------|--------|
| A2    | 0.205  | 0.2054 |
| B2    | 0.218  | 0.2184 |
| C2    | 0.225  | 0.2255 |
| D2    | 0.200  | 0.2004 |
| E2    | 0.150  | 0.1503 |
| total | 0.998  | 1.0000 | l. The number of respective pitches can be determined by making use of the $\alpha_i'$ values determined in the above item k.

$N_i$ = perimeter × $\alpha_i'$/pitch length $P_i$

Therefore, the pitch length, $\alpha_i$, $N_i$, and $N_i'$ (an integer obtained by rounding off the $N_i$ value) are as follows. Consequently, the proportion of each pitch can be determined with the total number of pitches slightly larger than the value provisionally determined in the initial stage, i.e., 57.

| Pitch | Pitch length (mm) | $\alpha_i'$ | $N_i$ | $N_i'$ |
|-------|-------------------|--------|------|-------|
| A     | 26                | 0.2054 | 14.9 | 15    |
| B     | 29                | 0.2184 | 14.2 | 14    |
| C     | 33                | 0.2255 | 12.9 | 13    |
| D     | 36                | 0.2004 | 10.5 | 10    |
| E     | 40                | 0.1503 | 7.1  | 7     | m. In this stage, adjustment of each pitch is conducted. Specifically, in the distribution of the number of respective pitches determined in the above item 1, $\Sigma(P_i \times N_i)/\pi = 593.6$. Since this value is not in agreement with the perimeter (600 mm) of the tire (593.6<600), correction is made by proportionating the pitch lengths. Since $600 \div 593.6 = 1.0108$, each pitch length determined in the initial stage is multiplied by this value to determine the final pitch length. The values thus obtained are shown in the following table, wherein $P_i'$ represents a value obtained by correcting $P_i$.

| Pitch | Pitch length (mm) | $P_i'$ | $a_i$ |
|---|---|---|---|
| A | 26 | 26.3 | 0.2092 |
| B | 29 | 29.3 | 0.2175 |
| C | 33 | 33.4 | 0.2303 |
| D | 36 | 36.4 | 0.1930 |
| E | 40 | 40.4 | 0.1500 |

The present invention will now be described in more detail with reference to the following Example:

Five steel radial tires having an outer diameter of 600 mm and a tire size of 165SR 13; Tires 1 and 2 of the present invention and Comparative Tires 1, 2 and 3, were prepared and subjected to evaluation of noise pulsation width (dB) and impression of the noise.

EVALUATION METHOD OF NOISE PULSATION WIDTH:

The noise pulsation width was determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn.

The respective tires have the following pitch arrangements over their full circumference.

Comp. Tire 1

AAAAAAAAABBBCCDDEEEEEDDDCCB-
BBAAAAAAAAABBBCC-
DDEEEEEEDDCCBBB

Comp. Tire 2

AAAAAABBBCCCDDDEEEEEEDDCCB-
BBAAAAAAAABBBCCCD-
DDEEEEEDDDCCCBBB

Comp. Tire 3

AAAAAAABBBCCCDDDEEEEDDCCBB-
BBAAAAAAAABBBCCCD-
DDEEEEEDDDCCCBBB

Tire 1 of Present Invention

AAAAAAAAABBBBCCCDDEEEDDDCCB-
BBAAAAAAAAABBBBCCC-
DDEEEEDCCCBBBB

Tire 2 of Present Invention

AAAAAAAABBBCCCDDDEEEDDDCCCBB-
BBAAAAAAABBBCCCDDEEEEDDCCCBBBB

The test results are shown in Table 2.

TABLE 2

| | Length of pitch A, number of pitches (proportion) | Length of pitch B, number of pitches (proportion) | Length of pitch C, number of pitches (proportion) | Length of pitch D, number of pitches (proportion) | Length of pitch E, number of pitches (proportion) | Pulsation width (dB) | Impression of noise | |
|---|---|---|---|---|---|---|---|---|
| | | | | | | | Evaluation | Remarks |
| Comp. tire 1 | 26.0<br>18<br>(0.248) | 29.0<br>12<br>(0.185) | 33.1<br>8<br>(0.140) | 36.0<br>9<br>(0.172) | 40.0<br>12<br>(0.255) | 7 | poor | impracticable due to remarkable low-frequency pitch noise and poor pulsation |
| Comp. tire 2 | 26.0<br>13<br>(0.179) | 29.0<br>12<br>(0.185) | 33.0<br>11<br>(0.193) | 36.0<br>11<br>(0.210) | 40.0<br>11<br>(0.233) | 6.3 | poor | impracticable due to remarkable low-frequency pitch noise and slightly poor pulsation |
| Comp. tire 3 | 26.0<br>15<br>(0.207) | 29.0<br>13<br>(0.200) | 33.3<br>11<br>(0.193) | 35.9<br>11<br>(0.210) | 40.0<br>9<br>(0.191) | 5.4 | good | no conspicuous pitch noise and pulsation on a level allowable for practical use |
| Tire 1 of the present invention | 26.2<br>18<br>(0.250) | 29.2<br>15<br>(0.232) | 33.3<br>11<br>(0.194) | 36.3<br>9<br>(0.173) | 40.3<br>7<br>(0.150) | 5 | good | excellent reduction in both pitch noise and pulsation |
| Tire 2 of the present invention | 26.3<br>15<br>(0.209) | 29.3<br>14<br>0.218 | 33.4<br>13<br>(0.230) | 36.4<br>10<br>(0.193) | 40.4<br>7<br>(0.150) | 4.1 | good | relatively good reduction in pitch noise and scarcely discernible pulsation |

As is apparent from Table 2, in Comparative Tire 1, since the proportions of the shortest and longest pitches are high, the dispersion of the pitch noise and the low order pulsation are significant, which renders this tire unsuitable for practical use. In Comparative Tire 2, since the proportion of the large pitch is high, this tire cannot be put to practical use, either. In Comparative Tire 3, since particular pitches are evenly distributed and the $a$ value is within $0.2 \pm 10\%$, not only the dispersion of the pitch noise is relatively excellent but also the low order pulsation is reduced, which renders this tire suitable for practical use. In the Tire 1 of the present invention, the shorter the pitch length, the larger the proportion. Specifically, the proportion of pitch A is by 25% larger than the even distribution, while the proportion of pitch E is 25% smaller than the even distribution. The proportion is gradually reduced in going from pitch A to pitch E. Therefore, the dispersion and pulsation of the pitch noise are both reduced over those of Comparative Tire 3. In Tire 2 of the present invention, pitch A and pitch E are first distributed in proportions by 13% higher than the even distribution and by 13% smaller than the even distribution, respectively. In this distribution, the proportion of pitch C is increased by 13%, while the proportions of pitches A and E are each reduced by 10 to 14%. This enables the pitch noise to be maintained in an excellent state of reduction and the pulsation to be the most remarkably reduced.

As described above, with respect to the tire noise wherein the rigidity of the pitch increases with the length of the pitch and the magnitude of the vibration of the tire varies with the size of the pitch, the proportion of each type of pitch is a very important factor of the pitch arrangement. In the present invention, it is possible to disperse the pitch noise and reduce the pulsation through equalization of the pitch distribution, adoption of a higher proportion of a shorter pitch, or reduction in the proportions of the longest and shortest pitches. The present invention is suitable particularly as a pneumatic tire for a passenger car.

What is claimed is:

1. A pneumatic tire having a tread surface comprising: two to ten periods of 3 to 8 types of tread design elements having pitches different from each other in the length over the full circumference of the tread surface and, when the length of the pitch of the i-th type is assumed to be $P_i$, the total number of said pitches appearing on the whole circumference of the tire is assumed to be $N_i$, the proportion $\alpha_i$ of the pitch of the i-th type is represented by the formula $\alpha_i = (P_i \times N_i)$/whole perimeter and NP is the number of types of the pitch length, wherein on a graph showing pitch lengths on an abscissa thereof and proportions of $\alpha_i$ of respective pitch lengths to a whole circumferential length of a tire on an ordinate of said graph, a line LL' is shown by connecting a proportion $\alpha_1$, within a range of $(1NP) \times 0.2 \sim (1/NP)$, of a pitch of a maximum length $P_1$ to the whole circumferential length of the tire and a proportion $\alpha_{NP}$, within a range of $(1/NP) \sim (1/NP) \times 1.8$, of the pitch of pitches of a minimum length $P_{NP}$ to the whole circumferential length of the tire, and the line LL' is then movable to positions at $\pm$ 10% of each of the proportions $\alpha_1$ and $\alpha_{NP}$ to depict lines m and n, wherein the proportions $\alpha_1$ to $\alpha_{NP}$ lie within a range between lines m and n, wherein the $\alpha_i$ value increases as pitch length is reduced.

2. A pneumatic passenger car tire having a tread surface comprising: two to ten periods of 3 to 8 types of tread design elements having pitches different from each other in the length over the full circumference of the tread surface and, when the length of the pitch of the i-th type is assumed to be $P_i$, the total number of said pitches appearing on the whole circumference of the tire is assumed to be $N_i$, the proportion $\alpha_i$ of the pitch of the i-th type is represented by the formula $\alpha_i = (P_i \times N_i)$/whole perimeter and NP is the number of types of the pitch length, wherein on a graph showing pitch lengths on an abscissa thereof and proportions of $\alpha_i$ of respective pitch lengths to a whole circumferential length of a tire on an ordinate of said graph, (a) a line LL' is shown by connecting a proportion $\alpha_l$, within a range of $(1/NP) \times 0.2 \sim (1/NP)$, of a pitch of a maximum length $P_1$ to the whole circumferential length of the tire and a proportion $\alpha_{NP}$, within a range of $(1/NP) \sim (1/NP) \times 1.8$, of the pitch or pitches of a minimum length $P_{NP}$ to the whole circumferential length of the tire, and the line LL' is then movable to positions at $\pm$ 10% of each of the proportions $\alpha_l$ and $\alpha_{NP}$ to depict lines m and n, wherein the proportions $\alpha_1$ to $\alpha_{NP}$ lie within a range between lines m and n wherein the $\alpha_i$ value increases as pitch length is reduced.

* * * * *